US012781569B2

(12) United States Patent
Green

(10) Patent No.: US 12,781,569 B2
(45) Date of Patent: Nov. 3, 2026

(54) MULTIPLE COMPONENT FRAME AND SCREEN SYSTEM AND METHOD

(71) Applicant: Marhaygue, LLC, Pawleys Island, SC (US)

(72) Inventor: Guerry E. Green, Georgetown, SC (US)

(73) Assignee: Marhaygue, LLC, Pawlyes Island (SC)

( * ) Notice: Subject to any disclaimer, the term of this patent is extended or adjusted under 35 U.S.C. 154(b) by 548 days.

(21) Appl. No.: 18/082,129

(22) Filed: Dec. 15, 2022

(65) Prior Publication Data

US 2024/0200402 A1 Jun. 20, 2024

(51) Int. Cl.

*E06B 9/24* (2006.01)
*E06B 1/04* (2006.01)
*E06B 3/99* (2006.01)
*E06B 9/52* (2006.01)

(52) U.S. Cl.

CPC .................. *E06B 9/52* (2013.01); *E06B 1/04* (2013.01); *E06B 3/99* (2013.01); *E06B 9/24* (2013.01); *E06B 2009/527* (2013.01)

(58) Field of Classification Search

CPC ..... E06B 9/52; E06B 1/04; E06B 3/99; E06B 9/24; E06B 2009/527

See application file for complete search history.

(56) References Cited

U.S. PATENT DOCUMENTS 1,022,312 A 4/1912 Foster
1,122,437 A 12/1914 Sweeney
1,187,402 A * 6/1916 Traut ........................ E06B 9/52 160/381
3,009,516 A * 11/1961 Albee, Jr. ................. E06B 9/52 160/381
3,124,858 A * 3/1964 Blonde ................... E04G 17/02 249/193

(Continued)

FOREIGN PATENT DOCUMENTS

DE 4311494 C1 * 11/1994 ........... E06B 3/6675
DE 19714557 C1 * 2/1999 ........... E06B 3/6604

(Continued)

*Primary Examiner* — Phi D A

(74) *Attorney, Agent, or Firm* — Bryan L. Baysinger; Maynard Nexsen PC

(57) ABSTRACT

Disclosed is a multiple component frame and screen system and method which may include lineal components with a hollow body, each lineal component capable of friction locking through the hollow body. The system may further include corner components, each corner component capable of friction locking with the lineal components. The system may further include splice components, each splice component capable of friction locking with the lineal components. The system may further include cross-bar components, each cross bar component capable of friction locking with the lineal components. A multiple component frame and screen may include a screen that interlocks in a screen lock channel of the lineal components, the corner components, the splice components, and the cross-bar components. Further, configuration methods are disclosed wherein the system is configured through the connector components, lineal components, and screen components.

20 Claims, 8 Drawing Sheets

(56) References Cited

U.S. PATENT DOCUMENTS

| | | | | | |
|---|---|---|---|---|---|
| 3,321,885 | A * | 5/1967 | Pratt | A47G 1/0605 | 160/381 |
| 3,374,597 | A * | 3/1968 | Whitener | E06B 9/52 | D25/48.8 |
| 3,726,551 | A * | 4/1973 | Levenberg | A47B 47/00 | 52/656.9 |
| 3,736,035 | A * | 5/1973 | Brown | A47B 97/001 | 403/375 |
| 3,866,380 | A * | 2/1975 | Benson | E06B 3/667 | 403/231 |
| 4,024,691 | A * | 5/1977 | Hansen | E06B 3/9645 | 403/402 |
| 4,284,299 | A * | 8/1981 | Kelly | E05B 65/0835 | 292/87 |
| 4,441,290 | A * | 4/1984 | Abell | E06B 3/285 | 52/202 |
| 4,502,260 | A * | 3/1985 | Machler | E04C 2/38 | D25/48.8 |
| 4,570,406 | A * | 2/1986 | DiFazio | E06B 3/9641 | 403/402 |
| 4,691,486 | A * | 9/1987 | Niekrasz | A47F 3/0434 | 219/547 |
| 4,723,388 | A * | 2/1988 | Zieg | E06B 3/685 | 52/456 |
| 4,986,050 | A * | 1/1991 | Brunetti | F24F 13/28 | 55/355 |
| 5,154,531 | A * | 10/1992 | Peterson | E06B 3/9644 | 403/403 |
| 5,431,211 | A * | 7/1995 | Guillemet | E06B 9/52 | 403/231 |
| 5,609,007 | A * | 3/1997 | Eichner | E04B 9/064 | 52/717.03 |
| 6,279,289 | B1 * | 8/2001 | Soder | E04B 1/24 | 52/848 |
| 6,332,657 | B1 * | 12/2001 | Fischer | A47B 47/005 | 403/217 |
| 6,464,745 | B2 * | 10/2002 | Rivera | B01D 46/523 | 55/497 |
| 7,614,188 | B2 * | 11/2009 | Hetherington | E06B 3/9641 | 52/204.58 |
| 8,037,923 | B2 * | 10/2011 | Alkhoury | E06B 9/52 | 160/369 |
| 8,074,698 | B2 * | 12/2011 | Allsopp | E06B 9/264 | 160/369 |
| 9,010,399 | B2 | 4/2015 | Perkowitz | | |
| 9,827,521 | B2 * | 11/2017 | Simmons | E06B 9/24 | |
| 9,970,232 | B2 | 5/2018 | Koenitz | | |
| 10,641,031 | B2 | 5/2020 | Koenitz | | |
| 2010/0288455 | A1 | 11/2010 | Liscano | | |
| 2016/0265274 | A1 | 9/2016 | Rapp | | |

FOREIGN PATENT DOCUMENTS

| | | | | |
|---|---|---|---|---|
| DE | 29921227 | U1 * | 3/2000 | E06B 3/667 |
| EP | 1522669 | A2 * | 4/2005 | E06B 3/667 |
| EP | 1522670 | B1 * | 5/2009 | E06B 3/6675 |

* cited by examiner 508
512
404
502
510
6
6

512
512
502
510
508

MULTIPLE COMPONENT FRAME AND SCREEN SYSTEM AND METHOD

FIELD

The present invention relates to a component based frame and screen system and method. In particular, a component system that allows for rapid assembly and installation of a frame and screen for openings in buildings.

BACKGROUND

The present disclosure relates generally to a component based frame and screen system and method of assembling the same. Frames, such as those for windows and doors, are utilized to provide a barrier to the elements and provide access to viewing the outdoors. Furthermore, frame comprise design aesthetics and functional features to help protect and create a display to the outdoors.

Typical components of a window, such as a double hung window, are a head that sits on top, a stool forming the bottom bracket, and an apron below the stool. Further, a window may be comprised of jambs on the vertical and a sill for drainage, along with a casing for outer appearance and protection. The frame itself may have a sash, panes, grilles, a sash lock, and a lift (if the frame allows for opening).

Typical components of a door, include a head jamb, a side jamb, a threshold and a sill. Further, the door may include a casing, glazing, screen, or other components. Further, a door may be configured as a screen door and the screen may have grilles running throughout.

The screen configured to a frame, of either a window or door, may be comprised of a metal screen, glass, or composite material, and may have grilles running through the same. Screens are utilized to let light in, while blocking out elements, including pests and debris.

Due to the overall size of windows and doors, shipping and assembling the same are expensive and often require special tools and freight handling. Windows vary greatly in size and can range from 24" by 36" on the smaller end and 48" by 48" on the larger end. Door assemblies may be even larger and can span distances of over 48" in width and 96" in height. Purchasing windows and doors often requires shipping on a truck or other vehicle that can accommodate the size to a customer's installation site. Further, the glazing and screen are often delicate and need protecting during shipping and installation, thus making freight shipment even more costly as expensive packaging materials may be required.

There is a long sought need to provide a frame system that can be purchased, transported, and assembled by consumers without the use of large vehicles, specialized tools, expensive packaging, and time consuming installation. The disclosure herein provides a solution to these problems and more by providing a configurable component based frame system and method.

SUMMARY

In some aspects, the techniques described herein relate to a multiple component frame and screen system, including: lineal components with a hollow body, each lineal component capable of friction locking through the hollow body; corner components, each corner component capable of friction locking with the lineal components; splice components, each splice component capable of friction locking with the lineal components; cross-bar components, each cross bar component capable of friction locking with the lineal components; and a screen that interlocks in a screen lock channel of the lineal components, the corner components, the splice components, and the cross-bar components.

In some aspects, the techniques described herein relate to a system, further including a screen locking insert that interlocks in the screen lock channel by compressing the screen into the screen lock channel.

In some aspects, the techniques described herein relate to a system, wherein the lineal components are included of a polymeric material.

In some aspects, the techniques described herein relate to a system, wherein the corner components, the splice components, and the cross-bar components are included of a polymeric material.

In some aspects, the techniques described herein relate to a system, wherein the lineal components are included of a metal.

In some aspects, the techniques described herein relate to a system, wherein the corner components, the splice components, and the cross-bar components are included of a metal.

In some aspects, the techniques described herein relate to a system, wherein the lineal components have a ridge to lock the corner components, the splice components, and the cross-bar components when friction locking.

In some aspects, the techniques described herein relate to a system, wherein the screen is comprised of fiberglass or metal or vinyl.

In some aspects, the techniques described herein relate to a system, wherein the lineal components are at most 16 inches long.

In some aspects, the techniques described herein relate to a system, wherein the lineal components, the corner components, the splice components, and the cross bar components are also held together with an adhesive at the friction locking locations.

In some aspects, the techniques described herein relate to a system, wherein the cross-bar components interlock with three lineal components.

In some aspects, the techniques described herein relate to a system, wherein the corner components, the splice components, and the cross-bar components have locking teeth to assist in friction fitting.

In some aspects, the techniques described herein relate to a method for assembling a multiple component frame and screen system, including: providing a plurality of lineal components, each with a hollow body; providing a plurality of corner components, splice components, and cross-bar components, wherein each component is capable of friction locking with the hollow body of each of the plurality of lineal components through a locking end placed interior to the hollow body; interlocking the plurality of lineal components to the plurality of corner components, splice components, and cross-bar components, wherein interlocking forms a frame for a window or a door; and applying a screen to a screen lock channel on the plurality of lineal components, corner components, splice components, and cross-bar components.

In some aspects, the techniques described herein relate to a method, further including applying a screen locking insert that interlocks in the screen lock channel by compressing the screen into the screen lock channel.

In some aspects, the techniques described herein relate to a method, wherein the lineal components are included of a polymeric material.

In some aspects, the techniques described herein relate to a method, wherein the corner components, the splice components, and the cross-bar components are included of a polymeric material.

In some aspects, the techniques described herein relate to a method, wherein the lineal components are included of a metal.

In some aspects, the techniques described herein relate to a method, wherein the corner components, the splice components, and the cross-bar components are included of a metal.

In some aspects, the techniques described herein relate to a method, wherein the plurality of lineal components have a ridge on the interior of the hollow body to interlock with the plurality of corner components, splice components, and cross-bar components.

In some aspects, the techniques described herein relate to a method, wherein the screen is comprised of fiberglass or metal or vinyl.

In some aspects, the techniques described herein relate to a method, wherein the each of the plurality of lineal components are at most 16 inches long.

In some aspects, the techniques described herein relate to a method, wherein the corner components, the splice components, and the cross-bar components have locking teeth to assist in friction fitting.

BRIEF DESCRIPTION OF THE DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. Therefore, in the drawings.

DETAILED DESCRIPTION

Figure 1:
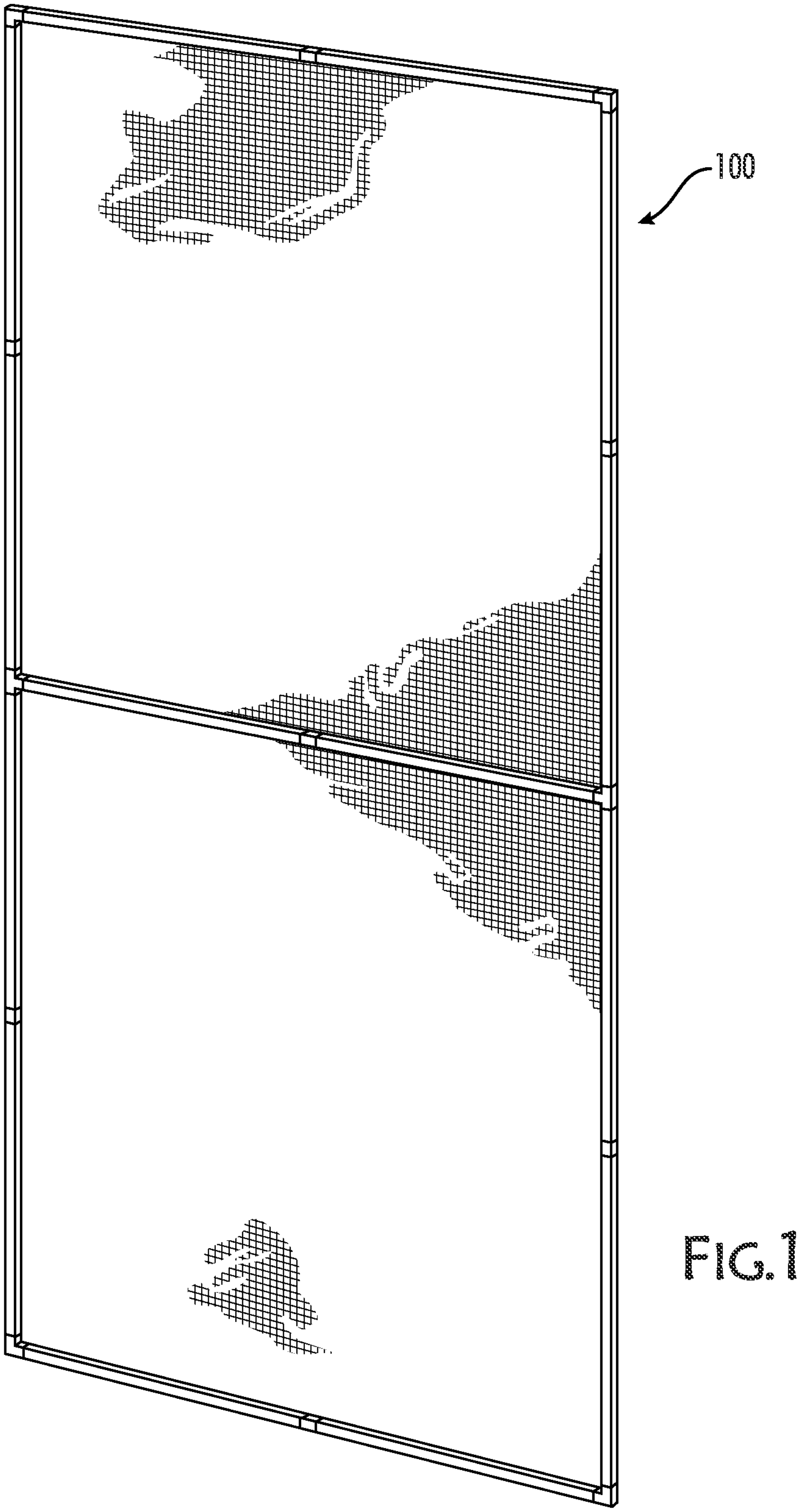
FIG. 1 is a perspective view of an example multiple component frame system.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Throughout this specification and the claims, the terms “comprise,” “comprises,” and “comprising” are used in a non-exclusive sense, except where the context requires otherwise. Likewise, the term “includes” and its grammatical variants are intended to be non-limiting, such that recitation of items in a list is not to the exclusion of other like items that can be substituted or added to the listed items.

I. Industrial Application

In one aspect, a multiple component frame and screen system reduces environmental impact. Namely, a reduction in shipping and freight costs associated with transporting compact packages. In said aspect, the length of the packaging may be limited to 16 inches, thus allowing more portable transfer and availability of window or door frames. Further, the polymeric material may be of recycled content, and as such reduce the environmental impact. In further industrial applications, the systems and methods disclosed herein may be utilized for purchase by consumers at retail locations, rather than ordering and customized shipments from manufacturing or fabrication facilities.

In another aspect, a multiple component frame and screen system may be installed by consumers, thus eliminating contractors and specialized tools. In said aspect the friction locking features allows for direct assembly with minimal tool requirements. Further, the light weight and compact packaging allow a consumer to purchase, transport, and install without the need for further customization, delivery assistance, and installation services.

In another aspect, the fastener points provide a template for instant installation of a frame and screen in predesigned or situations in which the window or door construction may lack framing elements. Thereby allowing for rapid installation and consumer installation, without the need for contractors or advanced tools.

II. With Reference to Figures

Referring now to FIG. 1, an example embodiment of an assembled multiple component frame and screen system 100. In the example, the lengths of the lineal components are 16 inches, in other aspects they may range from 2 inches to 48 inches. The longer the length of the lineal the more support that may be required, along with polymeric compositions with additives and/or other materials such as metal.

In one aspect, the frame of FIG. 1 is comprised of four corner components, wherein each corner component is interlocked, typically through a friction fitting, with a lineal component. Friction fitting, also known as interference fit or pressed fit, is a form of fastening that requires minimal tools and mates two parts to produce a joint that is held together by friction. Depending upon the amount of interference, tools such as a hammer may be used to press the components together. Additionally, heat may be applied to one component to allow mating of the components when the interference is high.

The tightness of fit on friction fitting is controlled by the amount of interference. The allowance is the planned difference from nominal size, which is dependent on the material being utilized to form the frame system. An example of allowance per inch of diameter usually ranges from 0.001 to 0.0025 inches. Applications disclosed herein have an average target for allowance of 0.0015 inches, though other ranges are available and will suit for the applications disclosed herein.

Referring to FIG. 1, the assembled multiple component frame and screen system 100 is friction fit, and comprises seven splice components. A splice component is a component that may connect two lineal components and can be utilized to increase the length and width of the frame by splicing additional lineal components. In one aspect the lineal components may be 16 inches in length and may be "stitched" together to form larger window frames. In other aspects, the lineal length may be as short as a few inches, and extend to over twenty-four inches.

Figure 2:
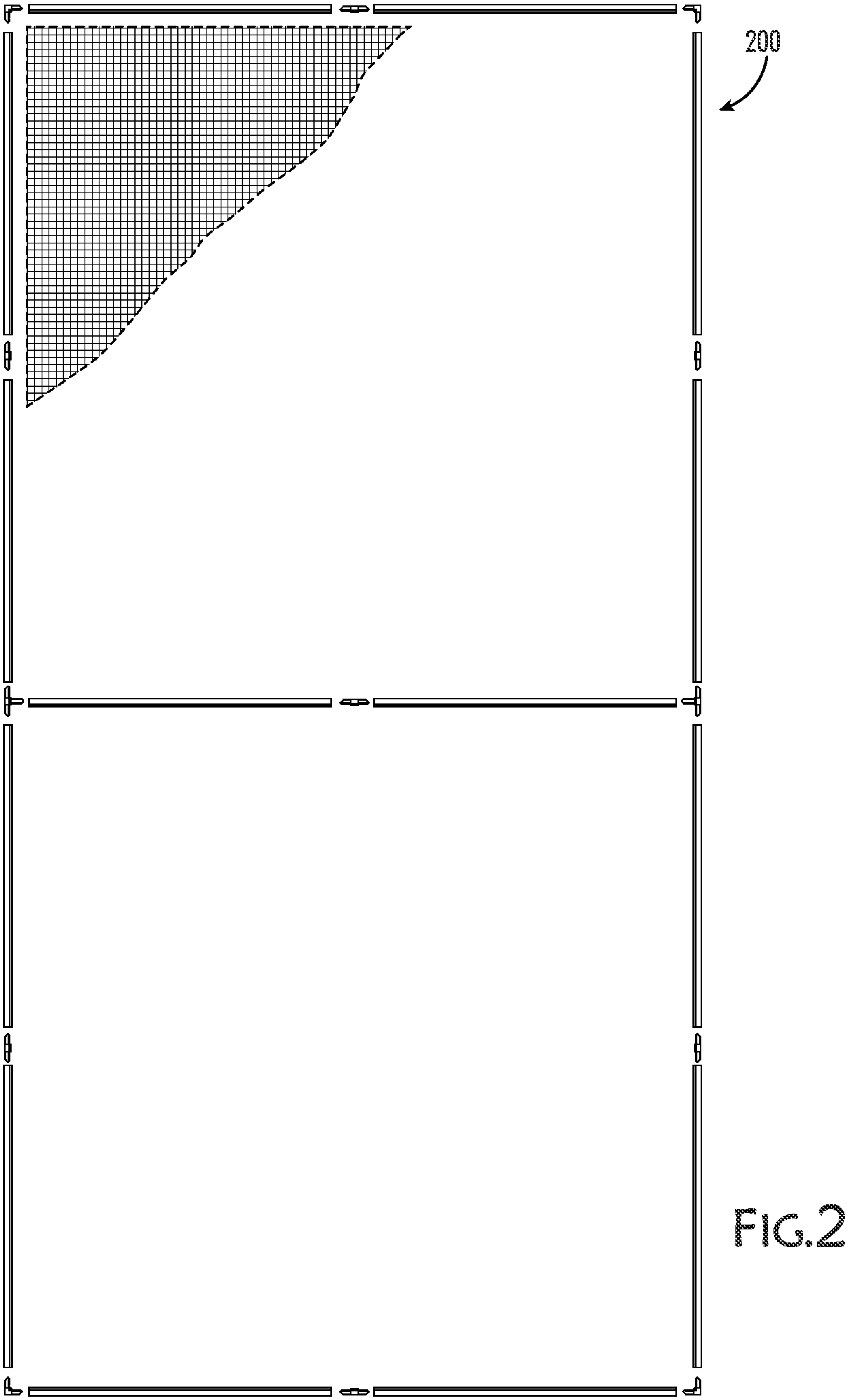
FIG. 2 is a front view of an example multiple component frame system.

Referring now to FIG. 2, an exploded view of a multiple component frame and screen system 200. In the exploded view the multiple components are disclosed forming a typical window frame. In other aspects, the components may be configured for a door frame, or for varying shapes and sizes of windows. In the example a series of four corner components, along with seven splice components and two cross bar components form the frame. The various components may be increased, for example, there may be additional cross bar components to add additional grilles or members crossing the screen section.

Continuing with FIG. 2, the components may be friction fit, and may comprise fastener locations in which to fasten the frame to a surface of a window or door. Further, the friction fit may be accompanied by adhesives and further increase the mating by applying an adhesive relative to the material. For example, if a lineal and a splice component are comprised of a polymeric material, the selected adhesive will bond exceptionally to said material. Similarly, if the lineal and splice component are comprised of a metal, the adhesive may be selected based on the type of metal. Example adhesives include, but are not limited to, epoxy and methacrylate (MMA), Cyanoacrylate, hot melt adhesives, PUR hot melt adhesives, to name a few.

Figure 3A:
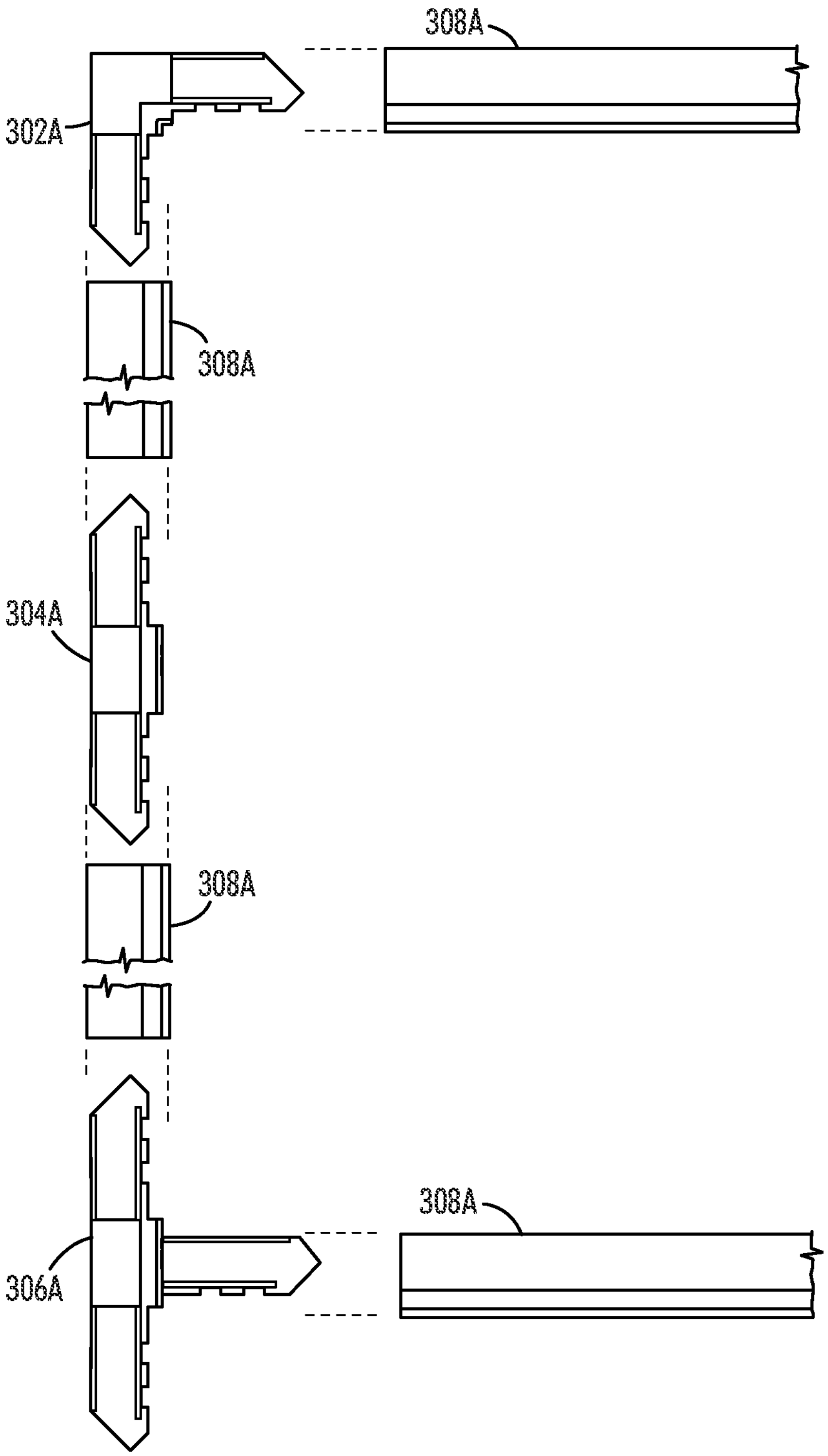
FIG. 3A is an exploded view of a perspective of an example embodiment of components of the multiple component frame system.

Referring now to FIG. 3A, an exploded view of a perspective of an example embodiment of components of the multiple component frame system. In the example the corner components 302A are disclosed with teeth or nodules that enhance the friction fit and friction locking Referring to the corner components 302A, in one aspect the corner components form a ninety-degree corner and each corner component 302A interlocks with one lineal component 308A. In this respect, the corner components form the corner of the frame and are typically comprised of a solid metal, whether it be a polymeric material or metal material. Thus, the corner components are more rigid than the lineal components, aiding in the friction fitting.

Referring to the splice components 304A, in one aspect the splice components serve to connect the lineal components to either additional lineal components to subscribe to a specific dimensionality, or to provide additional support for a frame that may require a stronger lineal connection. In the latter aspect, shorter lineal sections may be combined with splice components to increase rigidity. The hollow body lineal components server to reduce material waste while also providing for mating with the connector components. In other aspects, the splice components 304A have locking teeth to friction fit or friction lock with the lineal components. In the same aspect, the splice components 304A are designed to lock with two lineal components, thereby forming a run that may span a width and length of a desired window or door frame.

Referring now to cross-bar components 306A, in one aspect cross-bar components serve to connect the lineal components at a juncture of a grille or bar that runs through the screen area. The cross-bar component is configured to interlock by way of friction fitting, with or without adhesive, to three lineal components. As disclosed in the example of FIGS. 3A and 3B, the cross-bar component may provide additional strength and resiliency across the screen area, and may be utilized to add decorative grilles or to add strength and rigidity to the frame with cross members. As disclosed with the other connector components, in one aspect the cross-bar component is a solid member, rigid, and interlocks with the hollow body of the lineal component.

Figure 3B:
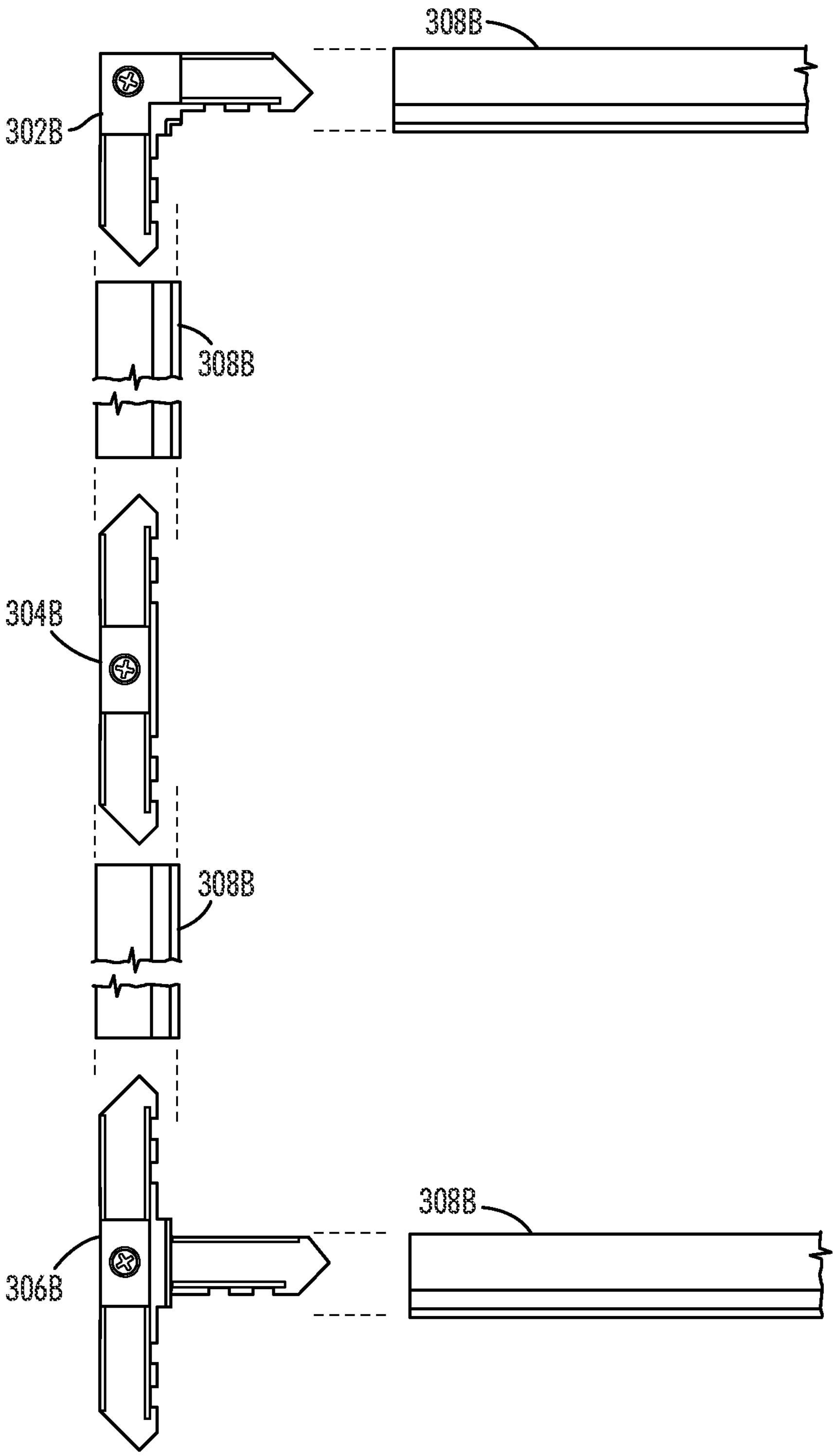
FIG. 3B is an exploded view of a perspective of an additional example embodiment of components of the multiple component frame system.

Referring now to FIG. 3B, an exploded view of a perspective of an additional example embodiment of components of the multiple component frame system. In the additional example the corner component 302B, splice component 304B, and cross-bar component 306B, comprise a fastener location that predefines a fastener location for attaching or fastening the multiple component frame and screen system to a wall or other structure, such a structural framing. In this aspect, the multiple connector components provide for fastener locations that avoid penetrating and weakening the hollow body lineal components. The connector components, known as the corner component 302B, splice component 304B, and the cross-bar component 306B are often made of thicker material and can serve as a better anchor point for attachment and fastening.

Further, the interlocking ends of the connector components may also have an adhesive applied that further secures the interlocking of components. Additional features include a nodule or raised indentation inside the hollow body of the lineal components that may engage the teeth or locking features of the connector components. In other aspects the lineal components may have the adhesive applied to the inside. Further, the hollow body of the lineal components may be filled with insulation, or may be comprised of a matrix material, or composite strip that further increases rigidity.

Figure 4:
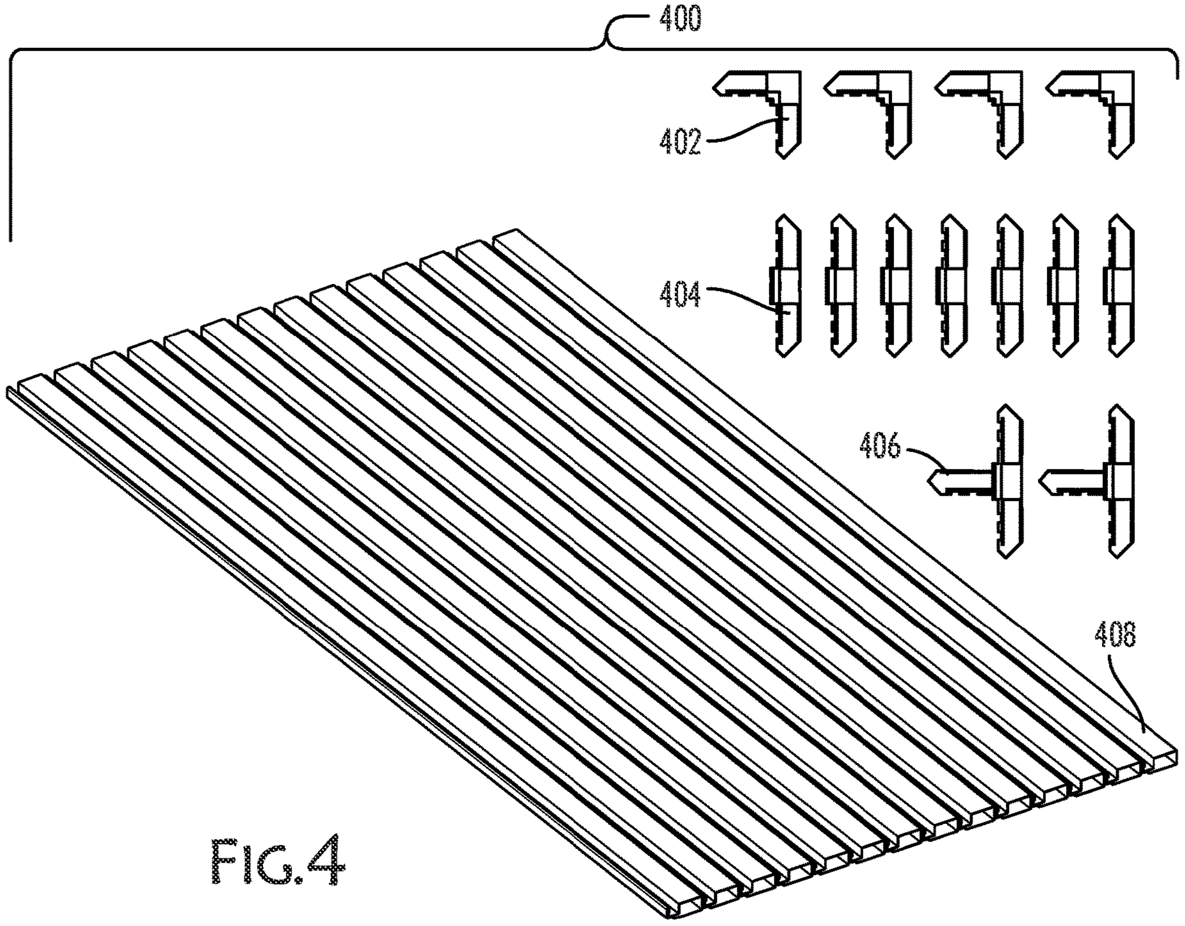
FIG. 4 is a layout view of an example embodiment of components making up a multiple component frame system.

Referring now to FIG. 4, a layout view of an example embodiment of components making up a multiple component frame system. In the example, the components are disassembled and prepared for configuring, thus the disassembled multiple component frame system 400 is depicted as a kit or package that may be sold to consumers. In one aspect, the four corner connectors 402 form the edges of the frame, and are constructed to withstand forces that may be incurred on the edge of a frame to a window or door.

Figures 5A, 5B:
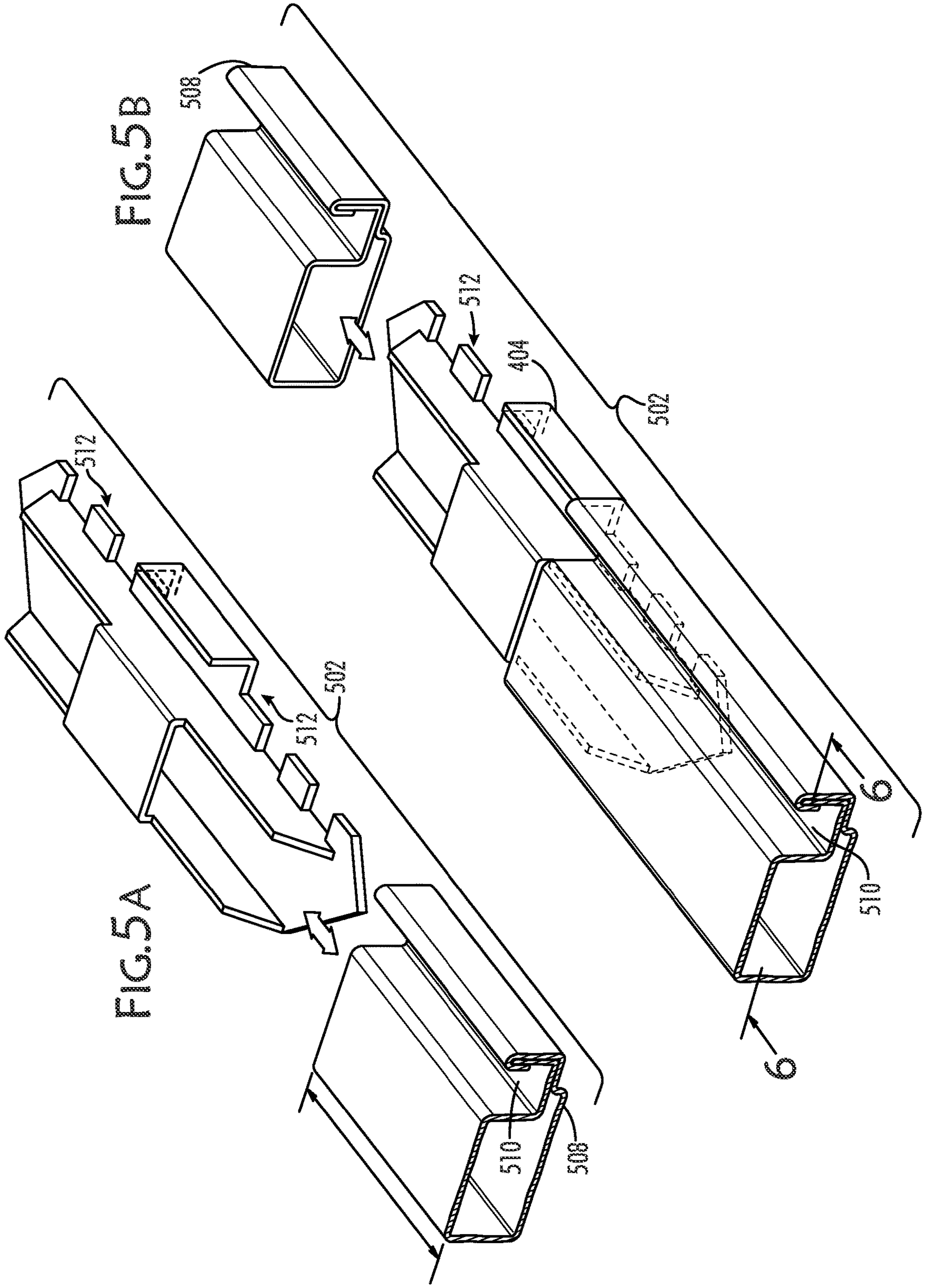
FIGS. 5A-B are illustrations of the splice frame component of the multiple component frame, wherein the splice frame component is shown integrating with a lineal.

Referring now to FIGS. 5A-B, illustrations of the splice frame component of the multiple component frame, wherein the splice frame component is shown integrating with a lineal. In the example, the splice component 512 is inserted into the lineal component 508. The insertion step 502 indicates the splice component 512 is friction locked into the lineal component 508. In other aspects, an adhesive may be applied to either component and then inserted, typically with force, to form the friction lock or attachment point. In other aspects the lineal component may have heat applied to allow for the connector components to more easily connect and configure with the lineal components. Thus, both a mechanical and chemical application may serve to hold the connector components in place with the lineal components.

Continuing, the splice component configures and provides for a locking channel 510, upon which the screen components may be attached. In one aspect, the locking channel 510 accepts a screen and a screen locking insert to hold the screen secure with mechanical force. In other aspects, fasteners may be applied to pre-drilled or pre-configured locations within the connector components, wherein a wood panel or storm protection panels may be applied.

Figure 6:
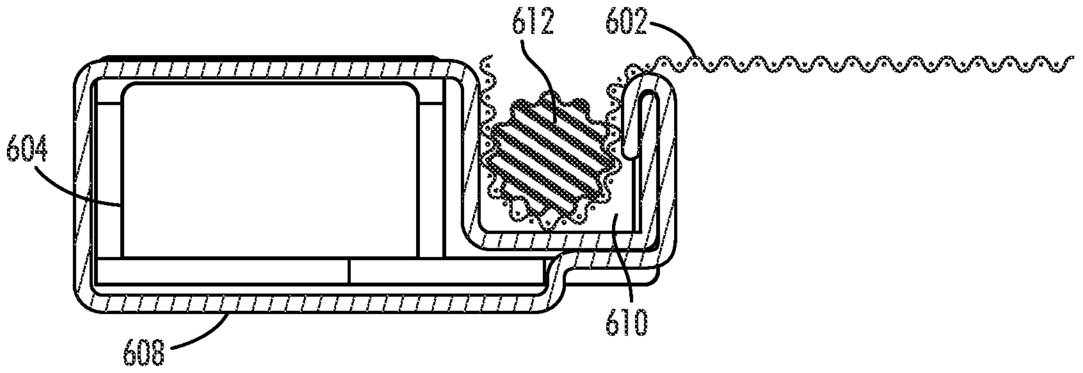
FIG. 6 is an illustration of a screen configuration within the multiple component frame system.

Referring now to FIG. 6, an illustration of a screen configuration within the multiple component frame system. In one aspect, the screen 602 is compressed, typically through a friction fit/interference fit, into a screen lock channel 610 within the lineal component 608. In the example a splice component 604 is friction fitted to the hollow body of the lineal component 608, and the screen lock channel 610 is featured on the inside edge of the lineal component 608. A screen locking insert 612 is compressed into the screen lock channel 610, along with the screen 602, wherein the compression holds the screen taught and secures it against elements.

Continuing, the screen may be comprised of fiberglass or metal or vinyl, or may be comprised of a polymeric material or any combination thereof. In one aspect, a screen is comprised of fiberglass coated in vinyl or other polymeric material. Further, a screen's gauge or thickness may be designed to protect from certain entomology or other aspects such as wind objects.

In other aspects of FIG. 6, fastener locations may also hold the screen 602, in particular fasteners that are located on the connector components, such as the corner components, splice components, or cross-bar components. In other aspects, the screen is also held with adhesive as well as interlocking or interference fitting within the screen lock channel. Further, the screen lock channel may only be present on the lineal components, or may be present on both the lineal components and the connector components.

In one aspect, a screen locking insert is a rubber material, in another it is a polymeric material, in yet another it may be comprised of metal, the principle remains the same, the screen locking insert locks the screen into the lineal component and holds it with enough force to withstand outdoor elements. In this regard, the screen locking insert applies mechanical force to hold the screen in place, and allows for rapid exchange of screen materials. Thus, the disclosed screen components allow for use of basic tools to exchange the screens when damaged, as well as replacement of sections with common materials, such as a rubberized bead with a grooved texture that will apply pressure/force to the locking channel in which to hold the screen.

Figure 7:
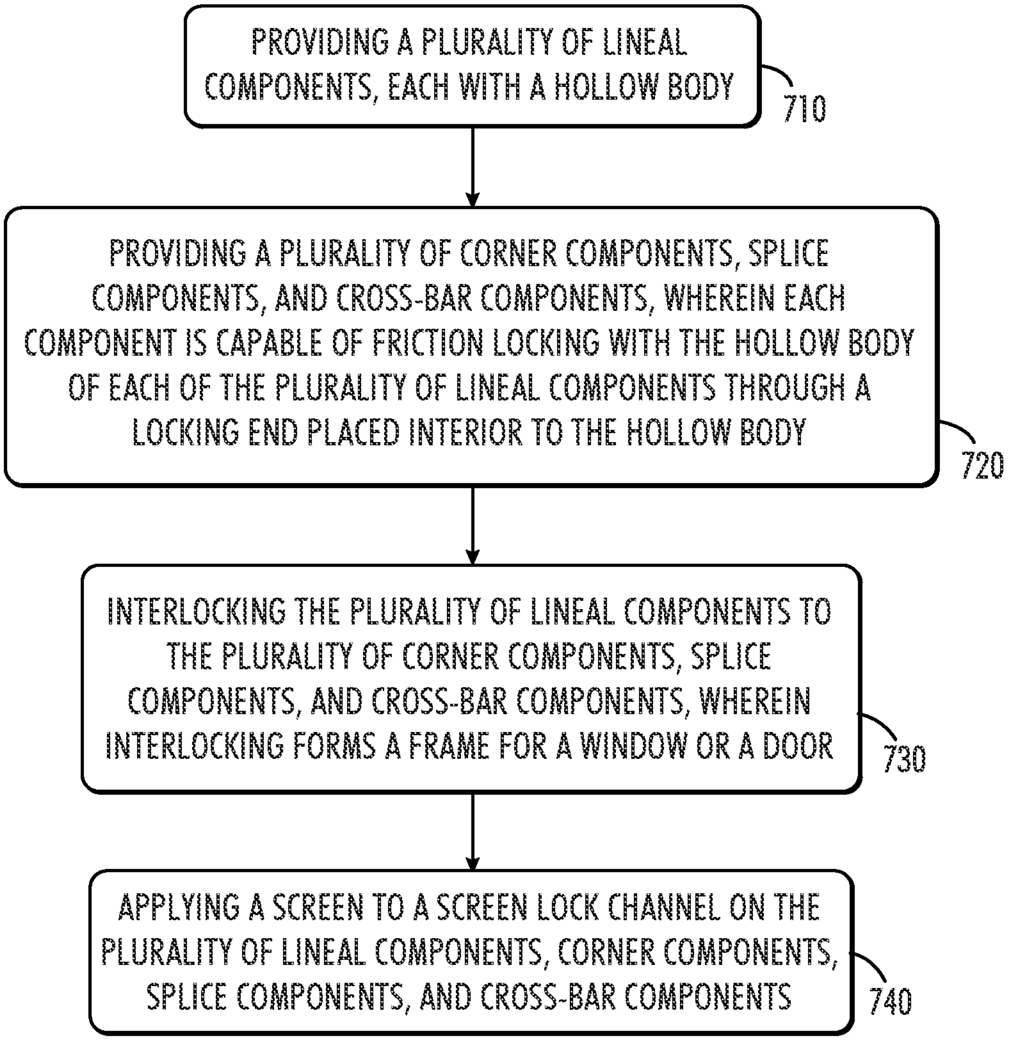
FIG. 7 is a flow diagram of a method of assembling a multiple component frame and screen.

Referring now to FIG. 7, a flow diagram of a method of assembling a multiple component frame and screen. In the example method, begin by providing a plurality of lineal components 710, each with a hollow body, and each lineal component may also be configured with a nodule for interlocking and an adhesive application. Further, each lineal component may be constructed of a polymeric material, through an extrusion, or of a metal component, or a combination thereof. Further, each lineal component may have additives for rigidity or may further comprise a stiffening composite strip Next, in reference to FIG. 7, providing a plurality of corner components, splice components, and cross-bar components, wherein each component is capable of friction locking with the hollow body of each of the plurality of lineal components through a locking end placed interior to the hollow body of each lineal component 720. Friction locking means held with friction force as above, it does not necessarily mean there is a lock form, and may be better understood as an interference fit.

Next, in the example method of FIG. 7, interlocking the plurality of lineal components to the plurality of corner components, splice components, and cross-bar components, wherein interlocking forms a frame for a window or door 730, or other opening in a building, such as a porch framing for keeping outside pests and or excess sunlight or wind from entering the interior of a building or patio.

Next, applying a screen to a screen lock channel on the plurality of lineal components, corner components, splice components, and cross-bar components 740. In the example, the screen is pressed into the channel and locked through a screen locking insert. The screen locking insert is at a diameter to cause an interference fit with the screen and the locking channel where as to mechanically hold the screen in place. In other aspects, the screen may be replaced with a cloth or fiber material, or may be inset with a metal or wood panel for storm protection. In other aspects, only the lineal components are configured with a screen lock channel, and the various connector components are flush with the screen lock channel whereas to not interfere with the screen locking insert. In additional aspects, the connector components, Below are examples of polymeric materials disclosed for various applications herein:

| Polymeric Material | Properties |
|---|---|
| Low-density polyethylene (LDPE) | Chemically inert, flexible, insulator |
| High-density polyethylene (HDPE) | Inert, thermally stable, tough and high tensile strength |
| Polypropylene | Resistant to acids and alkalies, high tensile strength |
| Polyvinyl chloride (PVC) | Insulator, flame retardant, chemically inert |
| Polychlorotrifluoroethylene (PCTFE) | Stable to heat and thermal, high tensile strength and non-wetting |
| Polyamide (Nylon) | High melting point, excellent abrasion resistance |
| Polyethylene terephthalate (PET) & (PETG) | High strength and stiffness, broad range of use temperatures, low gas permeability |

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A multiple component frame and screen system, comprising:

lineal components with a hollow body, each lineal component capable of friction locking through the hollow body, wherein the lineal components have a ridge on an interior of the hollow body to assist in friction locking;

corner components, each corner component capable of friction locking with the lineal components, wherein the corner components have locking teeth to assist in friction locking;

splice components, each splice component capable of friction locking with the lineal components by being inserted within the interior of the hollow body and engaging locking teeth of the splice components with the ridge on the interior of the hollow body, wherein the locking teeth of the splice components comprises at least one protrusion on one side of the splice components and that fits within the ridge of the hollow body;

cross-bar components, each cross-bar component capable of friction locking with the lineal components by being inserted within the interior of the hollow body and engaging locking teeth of the cross-bar components with the ridge on the interior of the hollow body, wherein the locking teeth of the cross-bar components comprises at least one protrusion on one side of the cross-bar components and that fits within the ridge of the hollow body, wherein each splice component interlocks between two of the lineal components, and the locking teeth of the splice component engage each ridge on each interior of each hollow body for both of the two of the lineal components, and wherein each corner component interlocks between two others of the lineal components, and the locking teeth of the corner component engage each ridge on each interior of each hollow body for both the two others of the lineal components; and a screen that interlocks in a screen lock channel of the lineal components, the corner components, the splice components, and the cross-bar components, wherein the ridge extends below the screen lock channel, and the locking teeth of the corner components and the locking teeth of the splice components engage the ridge below the screen lock channel.

2. The system of claim 1, further comprising a screen locking insert that interlocks in the screen lock channel by compressing the screen into the screen lock channel.

3. The system of claim 1, wherein the lineal components are comprised of a polymeric material.

4. The system of claim 1, wherein the corner components, the splice components, and the cross-bar components are comprised of a polymeric material.

5. The system of claim 1, wherein the lineal components are comprised of a metal.

6. The system of claim 1, wherein the corner components, the splice components, and the cross-bar components are comprised of a metal.

7. The system of claim 1, wherein the screen is comprised of fiberglass or metal or vinyl.

8. The system of claim 1, wherein the lineal components, the corner components, the splice components, and the cross-bar components are also held together with an adhesive at locations of the friction locking.

9. The system of claim 1, wherein the cross-bar components each include protrusions that interlock with three lineal components by interlocking first locking teeth of a first cross-bar component with a first ridge on an interior of a first lineal component, interlocking second locking teeth of the first cross-bar component with a second ridge of an interior of a second lineal component, and interlocking third locking teeth of the first cross-bar component with a third ridge of an interior of a third lineal component.

10. The system of claim 1, wherein at least one of the corner components, the splice components, or the cross-bar components comprises a predefined fastener location at which the multiple component frame and screen system is fastened to a wall or other structural framing, wherein the predefined fastener location defines an opening that receives a fastener in a direction perpendicular to each direction in which the at least one of the corner components, the splice components, or the cross-bar components extends, wherein the predefined fastener location is in a thicker portion of the at least one of the corner components, the splice components, or the cross-bar components, and wherein the predefined fastener location avoids penetrating the hollow body of any of the lineal components.

11. The system of claim 10, wherein, at the predefined fastener location, the fastener fastens the screen together with the at least one of the corner components, the splice components, or the cross-bar components to the wall or the other structural framing.

12. The system of claim 1, wherein the locking teeth of the splice components comprises a plurality of spaced protrusions.

13. A method for assembling a multiple component frame and screen system, comprising:

providing a plurality of lineal components, each with a hollow body having an interior ridge to aid in friction locking;

providing a plurality of corner components, splice components, and cross-bar components, wherein each corner component, splice component, and cross-bar component has locking teeth and is capable of friction locking with the hollow body of each of the plurality of lineal components through a locking end placed interior to the hollow body, wherein the locking teeth comprises at least one protrusion on one side and that fits within the ridge of the hollow body;

interlocking the plurality of lineal components to the plurality of corner components, splice components, and cross-bar components, wherein interlocking forms a frame for a window or a door, and wherein interlocking the plurality of lineal components to the plurality of corner components, splice components, and cross-bar components comprises:

inserting the splice components into the interior of the hollow body of a first at least one lineal component of the plurality of lineal components and engaging the locking teeth with the interior ridge of the hollow body of the first at least one lineal component; and inserting the cross-bar components into the interior of the hollow body of a second at least one lineal component of the plurality of lineal components and engaging the locking teeth with the interior ridge of the hollow body of the second at least one lineal component, wherein each splice component interlocks between two of the lineal components, and the locking teeth of the splice component engage each ridge on each interior of each hollow body for both of the two of the lineal components, and wherein each corner component interlocks between two others of the lineal components, and the locking teeth of the corner component engage each ridge on each interior of each hollow body for both the two others of the lineal components; and applying a screen to a screen lock channel on the plurality of lineal components, corner components, splice components, and cross-bar components, wherein the ridge extends below the screen lock channel, and the locking teeth of the corner components and the locking teeth of the splice components engage the ridge below the screen lock channel.

14. The method of claim 13, further comprising applying a screen locking insert that interlocks in the screen lock channel by compressing the screen into the screen lock channel.

15. The method of claim 13, wherein the plurality of lineal components are comprised of a polymeric material.

16. The method of claim 13, wherein the corner components, the splice components, and the cross-bar components are comprised of a polymeric material.

17. The method of claim 13, wherein the plurality of lineal components are comprised of a metal.

18. The method of claim 13, further comprising applying adhesive to the locking end of the corner components, the splice components, and the cross-bar components.

19. The method of claim 13, further comprising fastening the multiple component frame and screen system to a structure using a fastener, wherein the fastener is located on a predefined fastener location on at least one of the corner components, the splice components, or the cross-bar components and fastens in a direction perpendicular to each direction in which the at least one of the corner components, the splice components, or the cross-bar components extends without penetrating the hollow body of any one of the lineal components.

20. A multiple component frame and screen system, comprising:

lineal components with a hollow body, each lineal component capable of friction locking through the hollow body, wherein the lineal components have a ridge on an interior of the hollow body to assist in friction locking;

corner components, each corner component capable of friction locking with the lineal components, wherein the corner components have a plurality of spaced locking teeth to assist in friction locking, and wherein each corner components interlocks with the ridge of at least two of the lineal components;

splice components, each splice component capable of friction locking with the lineal components by being inserted within the interior of the hollow body and engaging a plurality of spaced locking teeth of the splice components with the ridge on the interior of the hollow body, wherein the locking teeth of the splice components comprises at least one protrusion on one side of the splice components and that fits within the ridge of the hollow body, and wherein each splice component interlocks with the ridge of at least another two of the lineal components;

cross-bar components, each cross-bar component capable of friction locking with the lineal components by being inserted within the interior of the hollow body and engaging locking teeth of the cross-bar components with the ridge on the interior of the hollow body, wherein the locking teeth of the cross-bar components comprises at least one protrusion on one side of the cross-bar components and that fits within the ridge of the hollow body, wherein each splice component comprises two separated protrusions that interlock between two of the lineal components, and the locking teeth of the splice component engage each ridge on each interior of each hollow body for both of the two of the lineal components, and wherein each corner component comprises two separated protrusions that interlock between two others of the lineal components, and the locking teeth of the corner component engage each ridge on each interior of each hollow body for both the two others of the lineal components; and a screen that interlocks in a screen lock channel of the lineal components, the corner components, the splice components, and the cross-bar components, wherein the screen lock channel is continuous across each of the lineal components, the corner components, the splice components, and the cross-bar components, wherein the ridge extends below the screen lock channel and is continuous across each of the lineal components, and the locking teeth of the corner components and the locking teeth of the splice components engage the ridge below the screen lock channel.

* * * * *